United States Patent
Toge

(10) Patent No.: US 11,866,532 B2
(45) Date of Patent: Jan. 9, 2024

(54) ACRYLIC RUBBER AND CROSSLINKABLE COMPOSITION THEREOF

(71) Applicant: UNIMATEC CO., LTD., Tokyo (JP)

(72) Inventor: Daichi Toge, Ibaraki (JP)

(73) Assignee: UNIMATEC CO., LTD., Tokyo (JP)

( * ) Notice: Subject to any disclaimer, the term of this patent is extended or adjusted under 35 U.S.C. 154(b) by 86 days.

(21) Appl. No.: 17/616,708

(22) PCT Filed: Apr. 20, 2020

(86) PCT No.: PCT/JP2020/017040
§ 371 (c)(1),
(2) Date: Dec. 6, 2021

(87) PCT Pub. No.: WO2020/250570
PCT Pub. Date: Dec. 17, 2020

(65) Prior Publication Data
US 2022/0306786 A1 Sep. 29, 2022

(30) Foreign Application Priority Data
Jun. 13, 2019 (JP) ................................ 2019-110275

(51) Int. Cl.
| | | |
|---|---|---|
| *C08F 220/26* | (2006.01) | |
| *C08F 220/28* | (2006.01) | |
| *C08F 220/18* | (2006.01) | |
| *C08K 5/31* | (2006.01) | |
| *C09K 3/10* | (2006.01) | |

(52) U.S. Cl.
CPC .... *C08F 220/283* (2020.02); *C08F 220/1804* (2020.02); *C08F 220/281* (2020.02); *C08F 220/286* (2020.02); *C08K 5/31* (2013.01); *C09K 3/1006* (2013.01); *C09K 2200/0625* (2013.01); *C09K 2200/0642* (2013.01)

(58) Field of Classification Search
CPC ............ C08F 220/1804; C08F 220/281; C08F 220/282; C08F 220/286
See application file for complete search history.

(56) References Cited

U.S. PATENT DOCUMENTS

| | | |
|---|---|---|
| 6,156,849 A | 12/2000 | Moriyama et al. |
| 2004/0110905 A1 | 6/2004 | Kubota et al. |
| 2017/0121439 A1 | 5/2017 | Emori et al. |
| 2019/0359801 A1* | 11/2019 | Saito .................... C08K 5/3465 |
| 2020/0002523 A1 | 1/2020 | Furuko et al. |
| 2020/0010597 A1 | 1/2020 | Mosaki |
| 2020/0115486 A1 | 4/2020 | Shiono |

FOREIGN PATENT DOCUMENTS

| | | | |
|---|---|---|---|
| EP | 2 177 564 | 6/2014 | |
| JP | 06-145257 | 5/1994 | |
| JP | 11-092614 | 4/1999 | |
| JP | 2006-193559 | 7/2006 | |
| JP | 2007-186631 | 7/2007 | |
| JP | 2008-214418 | 9/2008 | |
| JP | 2009-040922 | 2/2009 | |
| WO | 2007/114108 | 10/2007 | |
| WO | WO-2018110701 A1 * | 6/2018 | ............ B32B 25/14 |
| WO | 2018/143101 A1 | 8/2018 | |
| WO | 2018/168395 | 9/2018 | |
| WO | 2018/180207 A1 | 10/2018 | |
| WO | 2019/087876 | 5/2019 | |

OTHER PUBLICATIONS

ISR issued in WIPO Patent Application No. PCT/JP2020/017040, dated Jul. 7, 2020, English translation.
IPRP issued in WIPO Patent Application No. PCT/JP2020/017040, dated Dec. 14, 2021, English translation.
Supplementaly European Search Report issued in EP Patent Application No. 20822121.8, dated Jun. 1, 2023

* cited by examiner

*Primary Examiner* — Karuna P Reddy
(74) *Attorney, Agent, or Firm* — GREENBLUM & BERNSTEIN P.L.C.

(57) ABSTRACT

An acrylic rubber that is a copolymer in which 1 to 3 wt. % of a fumaric acid monoalkyl ester monomer containing an alkyl group having 1 to 8 carbon atoms is copolymerized as a crosslinkable comonomer, wherein 45 to 65 wt. % of n-butyl acrylate, 12 to 32 wt. % of 2-methoxyethyl acrylate, and 11 to 30 wt. % of ethoxyethoxyethyl acrylate are copolymerized in 100 wt. % of comonomers other than the crosslinkable comonomer. This acrylic rubber can suppress the reduction of oil resistance while improving cold resistance represented by a TR-10 value.

9 Claims, No Drawings

ACRYLIC RUBBER AND CROSSLINKABLE COMPOSITION THEREOF

TECHNICAL FIELD

The present invention relates to an acrylic rubber and a crosslinkable composition thereof. More particularly, the present invention relates to an acrylic rubber that can suppress the reduction of oil resistance while improving cold resistance and a crosslinkable composition thereof.

BACKGROUND ART

Current super cold-resistant grade acrylic rubber has a cold resistance (TR10 value) of about −40° C. When acrylic rubber is used as an oil seal molding material, the use thereof in extremely cold areas is difficult in view of cold resistance. In recent years, there has been an increasing demand for use of automobiles in extremely cold areas, and acrylic rubber as an oil seal molding material that can also be used in extremely cold areas has been required.

It is thought that the cold resistance of acrylic rubber can be improved by introducing an acrylic acid alkyl ester monomer that has a longer chain length on the alkyl group side than conventional ones. However, when the alkyl chain is merely extended, oil swelling resistance, which is an important characteristic as an oil seal molding material, overly increases, and such a material cannot be used as a practical molding material.

Patent Document 1 discloses an acrylic rubber composition compounded with silica that can improve its extrudability and roll processability without reducing its heat resistance. Patent Document 1 indicates that an alkyl (meth)acrylate-alkoxyalkyl (meth)acrylate copolymer or the like is used as the acrylic rubber; that the longer the alkyl group chain length in the alkyl (meth)acrylate is, the more advantageous in terms of cold resistance, but the less advantageous in terms of oil resistance; that these characteristics are reversed when the chain length is shorter; and that the alkoxyalkyl acrylate has an ether bond in a side chain, and thus has excellent cold resistance and oil resistance. Patent Document 1 also indicates that, from the viewpoint of the balance between cold resistance and oil resistance, Ethyl acrylate and n-butyl acrylate is preferably used as the alkyl acrylate, and 2-methoxyethyl acrylate and 2-ethxyethyl acrylate is preferably used as the alkoxyalkyl acrylate.

Further, Patent Document 2 discloses a peroxide crosslinkable acrylic rubber composition that has a high vulcanizing rate and can provide a vulcanizate having excellent normal state physical properties and compression set resistance characteristics, wherein copolymer rubber of alkyl (meth)acrylate and (meth)acrylate having an ether group forming a side chain is used as the acrylic rubber.

Patent Document 2 refers to, as the (meth)acrylate having a side chain ether group, alkoxyalkyl esters and aryloxyalkyl esters of (meth)acrylic acid, such as methoxymethyl, methoxyethyl, ethoxyethyl, butoxyethyl, ethoxypropyl and phenoxyethyl esters of (meth)acrylic acid, as well as methoxy triethylene glycol esters (Example 2)

$$\text{MeO(CH}_2\text{CH}_2\text{O)}_3\text{COCH}=\text{CH}_2$$

phenoxydiethylene glycol ester $$\text{PhO(CH}_2\text{CH}_2\text{O)}_2\text{COCH}=\text{CH}_2$$

phenoxypolyethylene glycol $$\text{PhO(CH}_2\text{CH}_2\text{O)}_n\text{COCH}=\text{CH}_2$$

of (meth)acrylic acid.

However, when a methoxy triethylene glycol ester (methoxyethoxyethoxyethyl acrylate [MTGA]) is used, the tensile strength and elongation at break are deteriorated compared with the Examples, as shown in the results of Comparative Examples 9 and 10 described later. Further, there are problems that the value of Mooney viscosity $ML_{1+4}$ (100° C.) is high, and that moldability is not good.

Patent Document 3 discloses an acrylic elastomer composition comprising an acrylic elastomer, an aromatic diamine compound vulcanizing agent, and a guanidine compound vulcanization aid, wherein the acrylic elastomer is obtained by copolymerizing (a) 30 to 90 wt. % of an alkyl acrylate containing an alkyl group having 1 to 8 carbon atoms, (b) 9.9 to 70 wt. % of an alkoxyalkyl acrylate containing an alkoxyalkyl group having 2 to 8 carbon atoms, (c) 0.1 to 10 wt. % of a fumaric acid mono-lower alkyl ester, and (d) 0 to 30 wt. % of a vinyl monomer or olefin monomer copolymerizable therewith. Patent Document 3 also indicates that this acrylic elastomer composition has excellent metal corrosion resistance, oil resistance, compression set characteristics, etc., and is effectively used as a vulcanization molding material for seal materials or hose materials used in parts that come into contact with metal parts and oil. A vulcanized molded product obtained from this acrylic elastomer composition has a TR-10 value of −37.1° C., which cannot satisfy the desired cold resistance.

Further, Patent Document 4 indicates that when a blend of terpolymer acrylic rubber of n-butyl acrylate, 2-methoxyethyl acrylate and vinyl monochloroacetate, and quaternary copolymer acrylic rubber obtained by further copolymerizing the terpolymer rubber and $CH_2=CHCOOC_2H_4O(COC_5H_{10}O)_mCOCH_3$ (m: 2.11 on average) is vulcanized, a vulcanizate having excellent cold resistance (i.e., TR-10 value: −44° C.) is provided; and that the TR-10 value of the vulcanizate of the terpolymer acrylic rubber alone is merely −40° C. Moreover, when the compression set value of the blend having a TR-10 value of −44° C. is measured, a value of 59% is obtained.

PRIOR ART DOCUMENTS

Patent Documents

Patent Document 1: JP-A-2009-40922
Patent Document 2: JP-A-2007-186631
Patent Document 3: JP-A-11-92614
Patent Document 4: JP-A-6-145257

OUTLINE OF THE INVENTION

Problem to be Solved by the Invention

An object of the present invention is to provide an acrylic rubber that can suppress the reduction of oil resistance while improving cold resistance represented by a TR-10 value, and to also provide a crosslinkable composition thereof.

Means for Solving the Problem

The above object of the present invention can be achieved by obtaining an acrylic rubber that is a copolymer in which 1 to 3 wt. % of fumaric acid monoalkyl ester monomer containing an alkyl group having 1 to 8 carbon atoms is copolymerized as a crosslinkable comonomer, wherein 45 to 65 wt. % of n-butyl acrylate, 12 to 32 wt. % of 2-methoxyethyl acrylate, and 11 to 30 wt. % of ethoxyethoxyethyl acrylate are copolymerized in 100 wt. % of comonomers other than the crosslinkable comonomer.

This ethoxyethoxyethyl acrylate copolymerized acrylic rubber is compounded with an aromatic diamine vulcanizing agent to form a crosslinkable composition.

Effect of the Invention

In acrylic rubber obtained by copolymerizing the copolymer known by Patent Document 3, which is obtained by copolymerizing an alkyl acrylate containing an alkyl group having 1 to 8 carbon atoms, an alkoxyalkyl acrylate containing an alkoxyalkyl group having 2 to 8 carbon atoms, and a fumaric acid mono-lower alkyl ester, with ethoxyethoxyethyl acrylate, which is not exemplified in Patent Document 3, the introduction of ethoxyethoxyethyl acrylate with a long side chain length inhibits the aggregation of acrylic copolymer molecular chains in a low temperature range, and Tg is reduced to improve its cold resistance.

Moreover, ethoxyethoxyethyl acrylate has a higher polarity than that of alkyl acrylates with a longer side chain, such as octyl acrylate, and thus can suppress the reduction of its oil resistance while improving its cold resistance.

This acrylic rubber can be crosslinked by using an aromatic diamine vulcanizing agent that undergoes a crosslinking reaction with carboxyl groups, that are crosslinkable groups introduced into the rubber. A vulcanizate obtained from such a crosslinkable composition reduces the TR-10 value to −41.0° C. or lower to improve its cold resistance.

EMBODIMENTS FOR CARRYING OUT THE INVENTION

The acrylic rubber according to the present invention is a copolymer in which ethoxyethoxyethyl acrylate is further copolymerized in an acrylic copolymer comprising n-butyl acrylate, 2-methoxyethyl acrylate, and a fumaric acid monoalkyl ester containing an alkyl group having 1 to 8 carbon atoms.

Ethoxyethoxyethyl acrylate $C_2H_5O(CH_2CH_2O)CH_2CH_2OCOCH=CH_2$ is used at a ratio of about 11 to 30 wt. %, preferably about 19 to 26 wt. %, in 100 wt. % of comonomers other than the crosslinkable comonomer of the resulting acrylic copolymer. If the copolymerization ratio of ethoxyethoxyethyl acrylate is less than this range, the desired effect of improving the cold resistance cannot be obtained. In contrast, if ethoxyethoxyethyl acrylate is used at a ratio larger than this range, the oil resistance, tensile strength, and compression set resistance characteristics are deteriorated.

Further, if a higher alkyl acrylate is used in place of ethoxyethyl acrylate, the oil resistance is deteriorated, as shown in Comparative Examples 7 and 8, described later.

n-Butyl acrylate, which is a main component of the acrylic copolymer, is used at a ratio of about 45 to 65 wt. %, preferably about 56 to 62 wt. %, in 100 wt. % of comonomers other than the crosslinkable comonomer of the copolymer.

Further, 2-methoxyethyl acrylate is used at a ratio of about 12 to 32 wt. %, preferably about 12 to 23 wt. %, in 100 wt. % of comonomers other than the crosslinkable comonomer of the copolymer. If 2-methoxyethyl acrylate is used at a ratio larger than this range, the desired effect of improving the cold resistance cannot be expected. In contrast, if 2-methoxyethyl acrylate is used at a ratio less than this range, its elongation at break is deteriorated.

In the acrylic copolymer, other vinyl monomers or olefin monomers, such as styrene, vinyl toluene, α-methylstyrene, vinyl naphthalene, acrylonitrile, methacrylonitrile, acrylamide, vinyl acetate, cyclohexyl acrylate and benzyl acrylate, can also be copolymerized within a range that does not inhibit the characteristics thereof (generally about 2 wt. % or less).

The fumaric acid monoalkyl ester monomer containing an alkyl group having 1 to 8 carbon atoms which is to be copolymerized in the acrylic copolymer containing these as its main components is used at a ratio of about 1 to 3 wt. %, preferably about 1 to 2.5 wt. %, in the copolymer. If the fumaric acid monoalkyl ester monomer containing an alkyl group having 1 to 8 carbon atoms is used at a ratio less than this range, the tensile strength and compression set resistance characteristics are deteriorated. In contrast, if the fumaric acid monoalkyl ester monomer is used at a ratio larger than this range, its elongation at break is reduced.

Examples of the fumaric acid monoalkyl ester monomer containing an alkyl group having 1 to 8 carbon atoms include monomethyl fumarate, monoethyl fumarate, monopropyl fumarate, monoisopropyl fumarate, mono-n-butyl fumarate, n-hexyl fumarate, 2-ethylhexyl fumarate, and the like; preferably mono-n-butyl fumarate is used.

The acrylic copolymer comprising each of the above copolymer components is produced by a general method for copolymerizing acrylic rubber. The copolymerization reaction can be carried out by any method, such as an emulsion polymerization method, a suspension polymerization method, a solution polymerization method, or a bulk polymerization method. An emulsion polymerization method or a suspension polymerization method is preferably adopted, and the reaction is carried out at a temperature of about −10 to 100° C., preferably about 5 to 80° C.

Examples of the polymerization initiator for the reaction include organic peroxides or hydroperoxides, such as benzoyl peroxide, dicumyl peroxide, tert-butyl hydroperoxide, cumyl hydroperoxide and p-methylene hydroperoxide; diazo compounds, such as azobisisobutyronitrile and azobisisobutylamidine; ammonium salts represented by ammonium persulfate; peroxide salts, such as sodium salts and potassium salts; and the like. These are used singly or as a redox system.

As an emulsifier used in the particularly preferable emulsion polymerization method, an anionic or nonionic surfactant is used as an aqueous solution or the like whose pH is optionally adjusted by acid or base, and which is formed into a buffer solution using an inorganic salt.

The polymerization reaction is continued until the conversion rate of the monomer mixture reaches 90% or more. The obtained aqueous latex is coagulated by a salt-acid coagulation method, a method using a salt, such as calcium chloride, magnesium sulfate, sodium sulfate, or ammonium sulfate, a method using a boron compound, such as boric acid or borax, a coagulation method by heat, a freeze coagulation method, or the like. The obtained copolymer is sufficiently washed with water and dried. This acrylic rubber has Mooney viscosity $ML_{1+4}$ (100° C.) of about 5 to 100, preferably about 20 to 80.

The obtained acrylic rubber is crosslinked and molded after being compounded with an aromatic diamine compound vulcanizing agent, and preferably further a guanidine compound vulcanization aid.

Examples of usable aromatic diamine compounds include 4,4'-methylenedianiline, m-phenylenediamine, 4,4'-diaminodiphenyl ether, p-phenylenediamine, p,p'-ethylenedianiline, 4,4'-(p-phenylenediisopropylidene)dianiline, 4,4'-(m-phenylenediisopropylidene)dianiline, 3,4'-diamin odiphenyl ether, 4,4'-diaminodiphenyl sulfone, 2,2-bis[4-(4-aminophenoxy)phenyl]propane, bis[4-(4-aminophenoxy)phenyl]sulfone, bis[4-(3-aminophenoxy)phenyl]sulfone, 4,4'-bis(4-aminophenoxy)biphenol, bis[4-(4-aminophenoxy)phenyl]ether, 2,2-b is [4-(4-aminophenoxy)phenyl]hexafluoropropane, 1,4-bis(4-aminophenoxy)benzene, 1,3-bis(4-aminophenoxy)benzene, and the like; preferably p-diamino substituted products are used.

Such an aromatic diamine compound is used at a ratio of about 0.1 to 5 parts by weight, preferably about 0.2 to 4 parts by weight, more preferably about 0.5 to 3 parts by weight, based on 100 parts by weight of the acrylic copolymer. If the compounding ratio is less than this range, crosslinking is insufficient, and sufficient compression set resistance characteristics cannot be obtained. In contrast, if the aromatic diamine compound is used at a ratio larger than this range, scorch occurs, and crosslinking does not occur. On the other hand, if an aliphatic diamine compound or an alicyclic diamine compound is used, scorch is very highly likely to occur, and it is difficult to secure processing stability.

Further, examples of guanidine compounds include, in addition to guanidine, diphenylguanidine, tetramethylguanidine, tetraethylguanidine, di-o-tolylguanidine, 1-o-tolyl-biguanide, di-o-tolylguanidine salts of dicatechol borate, and the like. Of these, diphenylguanidine and di-o-tolylguanidine are preferably used.

Such guanidine compounds are used at a ratio of about 0.1 to 10 parts by weight, preferably about 0.3 to 6 parts by weight, more preferably about 0.5 to 4 parts by weight, based on 100 parts by weight of the acrylic copolymer. If the compounding ratio is less than this range, the crosslinking rate decreases, and secondary crosslinking takes a long time, which is not practical. In contrast, if the guanidine compounds are used at a ratio larger than this range, crosslinking is inhibited, and sufficient compression set resistance characteristics cannot be obtained. When a vulcanization aid other than guanidine compounds is used, sufficient compression set resistance characteristics cannot be obtained.

After a reinforcing agent, a filler, a stabilizer, a processing aid, etc. are added to the acrylic copolymer by using a closed type kneading machine, a vulcanizing agent and a vulcanization accelerator are added by using an open roll to form a crosslinkable composition. Then, press crosslinking is performed at about 150 to 200° C. for about 1 to 30 minutes, optionally followed by oven crosslinking (secondary crosslinking) at about 150 to 180° C. for about 1 to 16 hours. Molding into a hose-like shape and crosslinking thereof are performed by injection molding or extrusion molding.

EXAMPLES

The following describes the present invention with reference to Examples.

Comparative Example 1 and Examples 1 to 7

(1) In a separable flask equipped with a thermometer, a stirrer, a nitrogen gas inlet tube, and a Dimroth condenser tube, the following components were charged:

| | |
|---|---|
| Water | 187 parts by weight |
| Sodium lauryl sulfate | 1.6 parts by weight |
| Polyoxyethylene lauryl ether | 1.6 parts by weight |
| n-Dodecyl mercaptan (chain transfer agent) | 0.01 parts by weight |
| Charged monomer mixture | 100 parts by weight |

After nitrogen gas substitution was carried out to sufficiently remove oxygen from the system, a redox initiator comprising:

| | |
|---|---|
| Sodium formaldehyde sulfoxylate (Rongalite, produced by Wako Pure Chemical Industries, Ltd.) | 0.011 parts by weight |
| Tertiary butyl hydroperoxide (Perbutyl H, produced by NOF Corporation) | 0.0063 parts by weight | was added to initiate the polymerization reaction under room temperature conditions, and the reaction was continued until the polymerization conversion rate reaches 90% or more. The formed aqueous latex was coagulated with a 10 wt. % sodium sulfate aqueous solution, washed with water, and dried, thereby obtaining an acrylic rubber.

Table 1 below shows the amount of the charged monomer mixture used (parts by weight) and the amount of the produced acrylic rubber (parts by weight).

TABLE 1

| Charged monomer mixture | Comp. Ex. 1 1 | Example 1 | 2 | 3 | 4 | 5 | 6 |
|---|---|---|---|---|---|---|---|
| n-BA | 55.0 | 55.0 | 55.0 | 55.2 | 54.8 | 54.4 | 60.0 |
| 2-MEA | 32.5 | 22.5 | 17.5 | 22.7 | 22.3 | 22.3 | 12.5 |
| EEEA | 9.5 | 19.5 | 24.5 | 19.6 | 19.4 | 18.8 | 24.5 |
| St | 1 | 1 | 1 | 1 | 1 | 1 | 1 |
| MBF | 2.0 | 2.0 | 2.0 | 1.5 | 2.5 | 3.5 | 2.0 |
| Amount of the produced acrylic rubber | 94.7 | 94.7 | 94.9 | 94.4 | 94.2 | 94.2 | 94.7 |

Notes:
n-BA: n-butyl acrylate
2-MEA: 2-methoxyethyl acrylate
EEEA: ethoxyethoxyethyl acrylate
St: styrene
MBF: mono-n-butyl fumarate Table 2 shows the copolymerization ratio, Mooney viscosity $ML_{1+4}$ (100° C.), and Tg value of the obtained acrylic rubber. The total amount of each monomer component, i.e., n-butyl acrylate, 2-methoxyethyl acrylate, and ethoxyethoxyethyl acrylate, is shown as 100 wt. % or 100 mol %.

TABLE 2

| Copolymerization ratio as measured by $^1$H-NMR | | Comp. Ex. 1 | Example | | | | | |
|---|---|---|---|---|---|---|---|---|
| | | | 1 | 2 | 3 | 4 | 5 | 6 |
| n-BA | wt. % | 57.2 | 57.3 | 56.9 | 57.2 | 57.0 | 57.6 | 61.9 |
| | mol % | 59.4 | 61.7 | 62.1 | 61.3 | 61.4 | 62.0 | 67.5 |
| 2-MEA | wt. % | 32.6 | 21.6 | 17.9 | 22.9 | 21.5 | 21.2 | 12.6 |
| | mol % | 33.4 | 22.8 | 19.2 | 24.2 | 22.8 | 22.5 | 13.5 |
| EEEA | wt. % | 10.2 | 21.1 | 25.2 | 19.9 | 21.5 | 21.2 | 25.6 |
| | mol % | 7.2 | 15.5 | 18.7 | 14.5 | 15.8 | 15.5 | 19.0 |
| MBF Notes) | wt. % | 1.34 | 1.35 | 1.33 | 1.01 | 1.71 | 2.31 | 1.35 |
| Mooney viscosity $ML_{1+4}$ (100° C.) | (point) | 24 | 22 | 22 | 21 | 21 | 22 | 22 |
| Polymer Tg | (° C.) | −45.6 | −48.1 | −50.2 | −48.5 | −48.6 | −48.5 | −50.3 |

Note)
The amount of MBF (the amount of carboxyl groups) in the acrylic rubber was quantified by neutralization titration.

(2) Using the acrylic rubber obtained in Comparative Example 1 and each Example, the following components were kneaded by using a closed type kneading machine.

| | |
|---|---|
| Acrylic rubber | 100 parts by weight |
| FEF carbon black | 60 parts by weight |
| Stearic acid | 2 parts by weight |
| Antioxidant (Nocrac CD, produced by Ouchi Shinko Chemical Industrial Co., Ltd.; 4,4′-bis(α,α-dimethylbenzyl)diphenylamine) | 2 parts by weight |
| Lubricant (Phosphanol RL-210, produced by Toho Chemical Industry Co., Ltd.) | 1 part by weight |
| Subsequently, the following components were added. | |
| Vulcanizing agent (Cheminox CLP 5250, produced by Unimatec Co., Ltd. | 2.5 parts by weight |
| Vulcanization accelerator (Nocceler DT, produced by Ouchi Shinko Chemical Industrial Co., Ltd.) | 1.0 part by weight |

The resulting mixture was kneaded using an open roll to prepare a crosslinkable acrylic rubber composition. This composition was subjected to press crosslinking at 180° C. for 8 minutes and then to oven crosslinking (secondary crosslinking) at 175° C. for 4 hours, and thereby an acrylic rubber molded article was obtained.

The acrylic rubber crosslinked molded article was measured for each of the following items.

Normal state physical properties: According to JIS K-6253 (2010) corresponding to ISO 7619-1: 2010, and JIS K-6251 (2010) corresponding to ISO 37: 2005

Oil swelling resistance test: According to JIS K-6258 (2010) corresponding to ISO 1817: 1999

IRM 903 oil was used, and volume changes ΔV100 after being immersed at 150° C. for 70 hours were measured TR test: According to JIS K-6261 (2006) corresponding to ISO 2921: 1997

TR-10 values were measured

Compression set: According to JIS K-6262 (2013) corresponding to ISO 815-1: 2008 and ISO 815-2: 2008, measurement values at 150° C. for 70 hours Table 3 below shows the above measurement results. The permissible standard targets for acceptance of each physical property value are as follows: tensile strength: 10.0 MPa or more, elongation at break: 130% or more, oil swelling resistance (ΔV100): 38% or less, TR-10: −41° C. or lower, and compression set: 15% or less.

TABLE 3

| Measurement item | | Comp. Example 1 | Example | | | | | |
|---|---|---|---|---|---|---|---|---|
| | | | 1 | 2 | 3 | 4 | 5 | 6 |
| Normal state physical properties | | | | | | | | |
| Hardness | (Duro A) | 61 | 63 | 61 | 60 | 64 | 65 | 62 |
| Mo 100 | (MPa) | 5.0 | 5.2 | 5.0 | 3.6 | 7.1 | 8.1 | 5.2 |
| Tensile strength | (MPa) | 11.1 | 10.5 | 10.2 | 10.2 | 10.5 | 10.5 | 10.2 |
| Elongation at break | (%) | 160 | 150 | 140 | 190 | 150 | 140 | 140 |
| ΔV100 | (%) | 29.5 | 33.8 | 35.9 | 31.8 | 27.4 | 26.5 | 36.9 |
| TR-10 | (° C.) | −40.0 | −42.1 | −43.2 | −42.8 | −42.8 | −42.5 | −43.5 |
| Compression set | (%) | 13 | 13 | 13 | 13 | 13 | 13 | 13 |

Comparative Examples 2 to 10

(1) In the Examples, the amounts of the charged monomer mixtures used (parts by weight) were each changed as follows.

TABLE 4

| Charged monomer mixture | Comparative Example | | | | | | | | |
|---|---|---|---|---|---|---|---|---|---|
| | 2 | 3 | 4 | 5 | 6 | 7 | 8 | 9 | 10 |
| n-BA | 55.8 | 54 | 55 | 55 | 55 | 55 | 55 | 54.5 | 54.5 |
| 2-MEA | 22.9 | 21.5 | 36.5 | 12.5 | 2.5 | 12.5 | 21.5 | 22.5 | 18.5 |
| HA | — | — | — | — | — | 29.5 | — | — | — |
| OA | — | — | — | — | — | — | 20.5 | — | — |
| EEEA | 19.3 | 18.5 | 5.5 | 29.5 | 39.5 | — | — | — | — |
| MTGA | — | — | — | — | — | — | — | 20.0 | 24 |
| ST | 1 | 1 | 1 | 1 | 1 | 1 | 1 | 1 | 1 |
| MBF | 1.0 | 5.0 | 2.0 | 2.0 | 2.0 | 2.0 | 2.0 | 2.0 | 2.0 |
| Amount of the produced acrylic rubber | 94.2 | 94.5 | 94.8 | 94.5 | 94.5 | 94.2 | 93.8 | 92.5 | 91.7 |

Notes:
HA: n-hexyl acrylate
OA: n-octyl acrylate
MTGA: methoxyethoxyethoxyethyl acrylate Table 5 below shows the copolymerization ratio, Mooney viscosity $ML_{1-4}$ (100° C.), and Tg value of the obtained acrylic rubber. In Comparative Example 7, the $^1$H-NMR peak of HA overlaps with that of n-BA, and in Comparative Examples 9 and 10, the $^1$H-NMR peak of MTGA overlaps with that of 2-MEA; thus, their determination is not possible. Therefore, their copolymerization ratios are unknown.

TABLE 5

| Copolymerization ratio as measured by $^1$H-NMR | | Comparative Example | | | | | | | | |
|---|---|---|---|---|---|---|---|---|---|---|
| | | 2 | 3 | 4 | 5 | 6 | 7 | 8 | 9 | 10 |
| n-BA | wt. % | 57.2 | 56.8 | 58.7 | 57.9 | 57.1 | — | 50.1 | — | — |
| | mol % | 61.3 | 61.2 | 60.1 | 64.3 | 65.5 | — | 56.0 | — | — |
| 2-MEA | wt. % | 22.9 | 21.7 | 35.7 | 11.6 | 2.83 | — | 20.8 | — | — |
| | mol % | 24.2 | 23.0 | 36.0 | 12.7 | 3.2 | — | 22.5 | — | — |
| HA | wt. % | — | — | — | — | — | — | — | — | — |
| | mol % | — | — | — | — | — | — | — | — | — |
| OA | wt. % | — | — | — | — | — | — | 28.2 | — | — |
| | mol % | — | — | — | — | — | — | 21.5 | — | — |
| EEEA | wt. % | 19.9 | 21.5 | 5.6 | 30.4 | 40.1 | — | — | — | — |
| | mol % | 14.5 | 15.8 | 3.9 | 23.0 | 31.3 | — | — | — | — |
| MTGA | wt. % | — | — | — | — | — | — | — | — | — |
| | mol % | — | — | — | — | — | — | — | — | — |
| MBF | wt. % | 0.70 | 3.25 | 1.34 | 1.33 | 1.31 | 1.34 | 1.35 | 1.34 | 1.33 |
| Mooney viscosity $ML_{1+4}$ (100° C.) | (point) | 20 | 22 | 27 | 20 | 15 | 22 | 23 | 28 | 26 |
| Polymer Tg | (° C.) | −48.4 | −48.5 | −44.1 | −52.4 | −55.0 | −49.9 | −48.7 | −51.0 | −50.9 |

(2) Using the acrylic rubbers obtained in Comparative Examples 2 to 10, crosslinking and measurement of each item were carried out in the same manner as in Comparative Example 1 and Examples 1 to 6. Table 6 below shows the measurement results.

TABLE 6

| Measurement item | | Comparative Example | | | | | | | | |
|---|---|---|---|---|---|---|---|---|---|---|
| | | 2 | 3 | 4 | 5 | 6 | 7 | 8 | 9 | 10 |
| | | Normal state physical properties | | | | | | | | |
| Hardness | (Duro A) | 50 | 75 | 63 | 60 | 62 | 59 | 61 | 63 | 67 |
| Mo 100 | (MPa) | 2.1 | 11.1 | 5.0 | 5.2 | 5.0 | 2.8 | 4.8 | 5.7 | 4.0 |
| Tensile strength | (MPa) | 9.1 | 11.1 | 11.0 | 9.2 | 7.8 | 10.9 | 11.2 | 9.4 | 8.2 |

TABLE 6-continued

| Measurement item | | Comparative Example | | | | | | | | |
|---|---|---|---|---|---|---|---|---|---|---|
| | | 2 | 3 | 4 | 5 | 6 | 7 | 8 | 9 | 10 |
| | | Normal state physical properties | | | | | | | | |
| Elongation at break | (%) | 210 | 100 | 160 | 140 | 120 | 200 | 160 | 110 | 110 |
| ΔV100 | (%) | 35.5 | 22.9 | 28.0 | 39.0 | 43.1 | 97.2 | 79.5 | 28.0 | 28.7 |
| TR-10 | (° C.) | −42.0 | −42.1 | −39.1 | −44.4 | −46.2 | −43.0 | −42.1 | −43.7 | −45.2 |
| Compression set | (%) | 16 | 20 | 12 | 14 | 15 | 12 | 12 | 12 | 15 |

The above results demonstrate the following.
(1) The cold resistance (TR-10) of conventional acrylic rubber can be improved by copolymerizing 11 to 30 wt. %, preferably 19 to 26 wt. %, of ethoxyethoxyethyl acrylate [EEEA] (each Example).
(2) If the amount of crosslinkable monomer is too low, the compression set is deteriorated due to a decrease in crosslink density (Comparative Example 2).
(3) If the amount of crosslinkable monomer is too large, the rubber composition gets hardened, and the elongation and compression set are deteriorated (Comparative Example 3).
(4) If the amount of EEEA is too low, the effect of improving cold resistance is not sufficiently exhibited (Comparative Examples 1 and 4).
(5) If the amount of EEEA is too high, the cold resistance is improved; however, the normal state value (and compression set) are deteriorated, and the oil swelling resistance increases (Comparative Examples 5 and 6).
(6) The use of an alkyl acrylate with a longer chain than n-BA in place of ethoxyethoxyethyl acrylate improves cold resistance, but significantly increases oil swelling resistance, which is impractical (Comparative Examples 7 and 8).
(7) The use of methoxytriethylene glycol acrylate [MTGA], which is a long-chain alkoxy acrylate, improves cold resistance, but deteriorates normal state physical properties (tensile strength and elongation at break) (Comparative Examples 9 and 10).

The invention claimed is:

1. An acrylic rubber that is a copolymer in which 1.01 to 2.31 wt. % of a fumaric acid monoalkyl ester monomer containing an alkyl group having 1 to 8 carbon atoms is copolymerized as a crosslinkable comonomer, wherein 56.9 to 61.9 wt. % of n-butyl acrylate, 12.6 to 22.9 wt. % of 2-methoxyethyl acrylate, and 19.9 to 25.6 wt. % of ethoxyethoxyethyl acrylate are copolymerized in 100 wt. % of comonomers other than the crosslinkable comonomer.

2. The acrylic rubber according to claim 1, wherein 2 wt. % or less of a vinyl monomer or olefin monomer is further copolymerized.

3. The acrylic rubber according to claim 1, wherein its Mooney viscosity $ML_{1+4}$ (100° C.) is 5 to 100.

4. A crosslinkable acrylic rubber composition comprising the acrylic rubber according to claim 1, and an aromatic diamine vulcanizing agent.

5. The crosslinkable acrylic rubber composition according to claim 4, wherein a guanidine compound vulcanization aid is further comprised.

6. A crosslinked molded product crosslinked and molded from the crosslinkable acrylic rubber composition according to claim 4.

7. The crosslinked molded product according to claim 6, which has a TR-10 value of −41° C. or lower.

8. The crosslinked molded product according to claim 6, which is used as a sealing material.

9. The crosslinked molded product according to claim 7, which is used as a sealing material.

* * * * *